United States Patent
Pei

(10) Patent No.: US 9,145,252 B2
(45) Date of Patent: Sep. 29, 2015

(54) EJECTING DEVICE FOR USE IN COATING DEVICE

(71) Applicant: HON HAI PRECISION INDUSTRY CO., LTD., New Taipei (TW)

(72) Inventor: Shao-Kai Pei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 341 days.

(21) Appl. No.: 13/692,942

(22) Filed: Dec. 3, 2012

(65) Prior Publication Data

US 2013/0327270 A1    Dec. 12, 2013

(30) Foreign Application Priority Data

Jun. 11, 2012  (TW) .................................. 101120829

(51) Int. Cl.
*B05C 13/00* (2006.01)
*B65D 83/00* (2006.01)
*B05C 13/02* (2006.01)
*B05B 13/02* (2006.01)
*B29D 11/00* (2006.01)

(52) U.S. Cl.
CPC ................ *B65D 83/00* (2013.01); *B05B 13/02* (2013.01); *B05B 13/0221* (2013.01); *B05C 13/00* (2013.01); *B05C 13/02* (2013.01); *B29D 11/00865* (2013.01)

(58) Field of Classification Search
CPC .... B05B 13/02; B05B 13/0221; B05C 13/00; B05C 13/02
USPC .......................................................... 118/500
See application file for complete search history.

(56) References Cited

U.S. PATENT DOCUMENTS

| 2,054,204 A * | 9/1936 | McDonald ..................... 73/45.5 |
| 4,627,526 A * | 12/1986 | Masciarelli ................. 193/35 A |
| 2005/0089645 A1* | 4/2005 | Keigler et al. ............. 427/443.1 |
| 2013/0085356 A1* | 4/2013 | Schlottau et al. ............. 600/335 |

FOREIGN PATENT DOCUMENTS

CN             2925150 Y    *   7/2007

\* cited by examiner

*Primary Examiner* — Dah-Wei D Yuan
*Assistant Examiner* — Stephen Kitt
(74) *Attorney, Agent, or Firm* — Novak Druce Connolly Bove + Quigg LLP

(57) ABSTRACT

An ejecting device includes a supporting plate and a balloon member. The supporting plate includes a top surface. The balloon member is fixed on the top surface and includes a main portion and a number of ejecting portions. The main portion is configured for receiving fluid. The ejecting portions are positioned on the main portion. When the main portion is full filled with the fluid, each ejecting portion protrudes from the main portion.

11 Claims, 4 Drawing Sheets

EJECTING DEVICE FOR USE IN COATING DEVICE

BACKGROUND

1. Technical Field

The present disclosure relates to coating devices and, particularly, to an ejecting device for use in a coating device.

2. Description of Related Art

Coating devices usually include an umbrella-shaped rack on which workpieces can be loaded. The rack defines a number of accommodating holes, each of which is used for receiving a respective workpiece. After being coated, each workpiece is manually ejected out of a respective accommodating hole, which is an inefficient use of man power.

Therefore, it is desired to provide an ejecting device for use in a coating device, which can overcome the above-mentioned problem.

DETAILED DESCRIPTION

Figure 1:
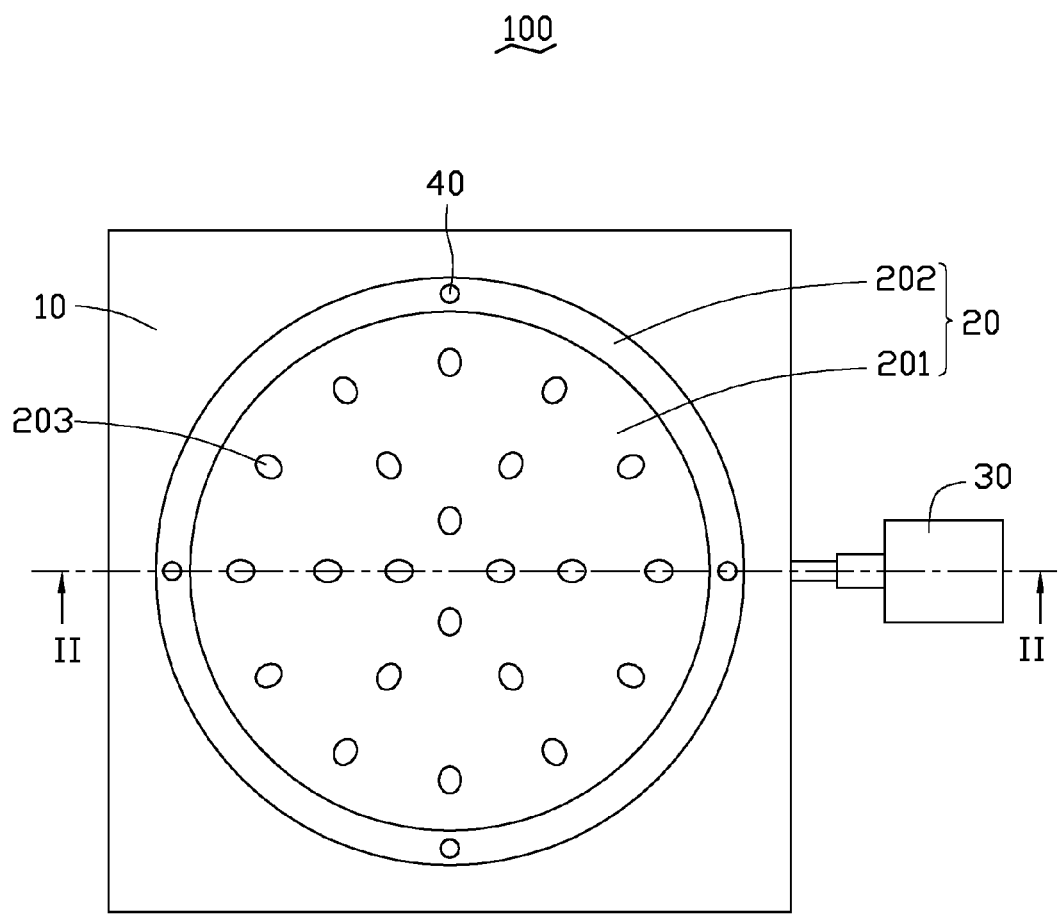
FIG. 1 is a top plan view of an ejecting device for use in a coating device according to an exemplary embodiment.
Figure 2:
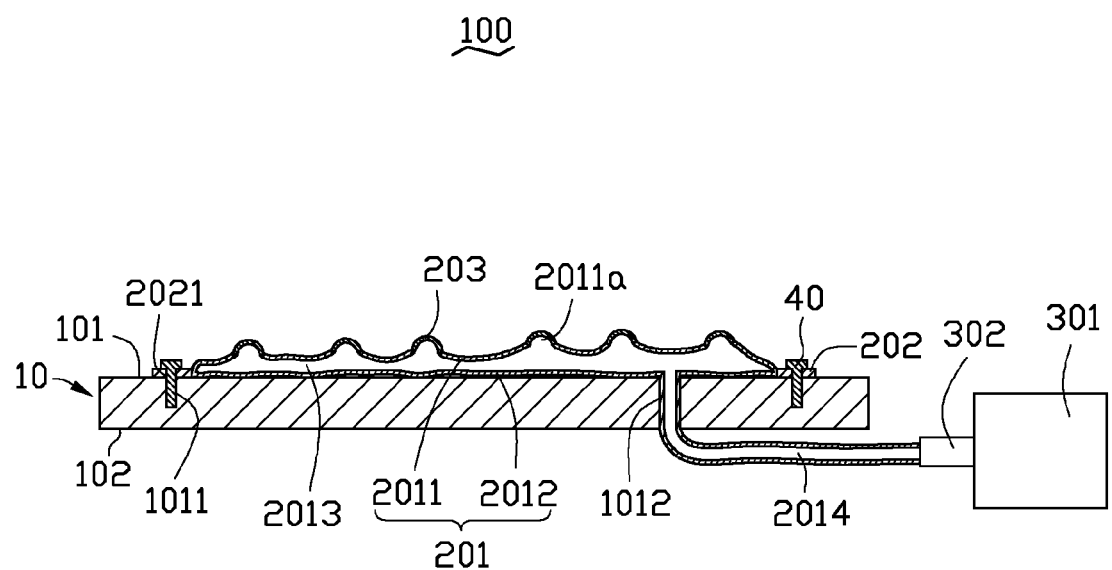
FIG. 2 is a cross-sectional view taken along line II-II of the ejecting device of FIG. 1.

FIGS. 1 and 2 illustrate an ejecting device 100 for use in a coating device (not shown), according to an exemplary embodiment. The ejecting device 100 includes a supporting plate 10, a balloon member 20, and a fluid supplying device 30.

The supporting plate 10 is made of metal and substantially cuboid. The supporting plate 10 includes a top surface 101 and a bottom surface 102 opposite to the top surface 101. The supporting plate 10 defines a number of first mounting holes 1011 and a receiving hole 1012 on the top surface 101. The first mounting holes 1011 are blind threaded holes and the number of the first mounting holes 1011 are four. The four first mounting holes 1011 are distributed on a circumference of a circle. The receiving hole 1012 passes through the top surface 101 and the bottom surface 102.

The balloon member 20 is made of elastic material, such as silica gel, rubber, or resin. In the embodiment, the balloon member is made of silica gel. The balloon member 20 includes a main portion 201 and a margin portion 202 surrounding the main portion 201. The main portion 201 includes an upper layer 2011 and a lower layer 2012. The upper layer 2011 and the lower layer 2012 are both generally circular and elastic. A periphery of the upper layer 2011 is connected and sealed with a periphery of the lower layer 2012. The balloon member 20 further includes a number of ejecting portions 203 positioned on the upper layer 201. Each ejecting portion 203 is made of elastic material such as silica gel and is balloon-like.

The upper layer 2011 defines a number of through holes 2011a. The ejecting portions 203 and the upper layer 2011 are respectively manufactured. Each ejecting portion 203 is adhered to the upper layer 2011 to seal a respective one of the through holes 2011a, such that each ejecting portion 203 is in communication with the main portion 201. The ejecting portions 203 are substantially uniformly distributed on a surface of the upper layer 2011 facing away from the lower layer 202. In one embodiment, the ejecting portions 203 can be distributed in a number of concentric circles and the ejection portions 203 in each circle are uniformly spaced. In alternative embodiments, the ejecting portions 203 can be integrally manufactured with the main portion 201 and extend up from the upper layer 2011.

The upper layer 2011, the lower layer 2012, and the ejecting portions 203 cooperatively form a receiving chamber 2013. The lower layer 2012 is attached to the top surface 101. The main portion 201 includes an inlet portion 2014 extending up from the lower layer 2012. The inlet portion 2014 is pipe-liked and in communication with the receiving chamber 2013. The inlet portion 2014 passes through the receiving hole 1012 and protrudes out from the bottom surface 102, namely, the inlet portion 2014 is partially received in the receiving hole 1012. When the inlet portion 2014 is enclosed, the receiving chamber 2013 is an enclosed space. The receiving chamber 2013 is used to receive fluid such as gas or liquid. The main portion 201 has a variable shape before the receiving chamber 2013 is full filled with fluid while has an invariable shape after the receiving chamber 2013 is full filled with fluid.

The margin portion 202 is annular and integrally formed with the main portion 201. The margin portion 202 defines a number of second mounting holes 2021 passing through the margin portion 202. In the embodiment, the number of the second mounting hole 2021 is four and the four second mounting holes 2021 are uniformly distributed on the margin portion 202. Each second mounting hole 2021 corresponds to a respective one of the first mounting holes 1011. The balloon member 20 is mounted to the supporting plate 10 by a number of fixing elements 40, each fixing element 40 passes a respective one of the second mounting holes 2021 and engages with a respective one of the first mounting holes 1011. In the embodiment, the fixing elements 40 are screws and the number of the fixing elements 40 is four. In alternative embodiment, the number of fixing elements 40 is not limited to four and can be at least three, accordingly, the numbers of the first mounting hole 1011 and the second mounting holes 2021 are both equal to the number of the fixing elements 40.

The fluid supplying device 30 includes a base 301 and a transmission pipe 302. The base 301 is used to supply fluid to the receiving chamber 2013. For example, when fluid is gas, the base 301 is a blower. When fluid is liquid, the base 301 includes a container for receiving liquid and a pump for pumping the liquid into the receiving chamber 2013. In the embodiment, fluid is gas and the base 301 is a blower. One end of the transmission pipe 302 is connected to the inlet portion 2014 and the other end is connected to the base 301, such that fluid supplied by the base 301 can be introduced into the receiving chamber 2013 through the transmission pipe 302.

Figure 3:
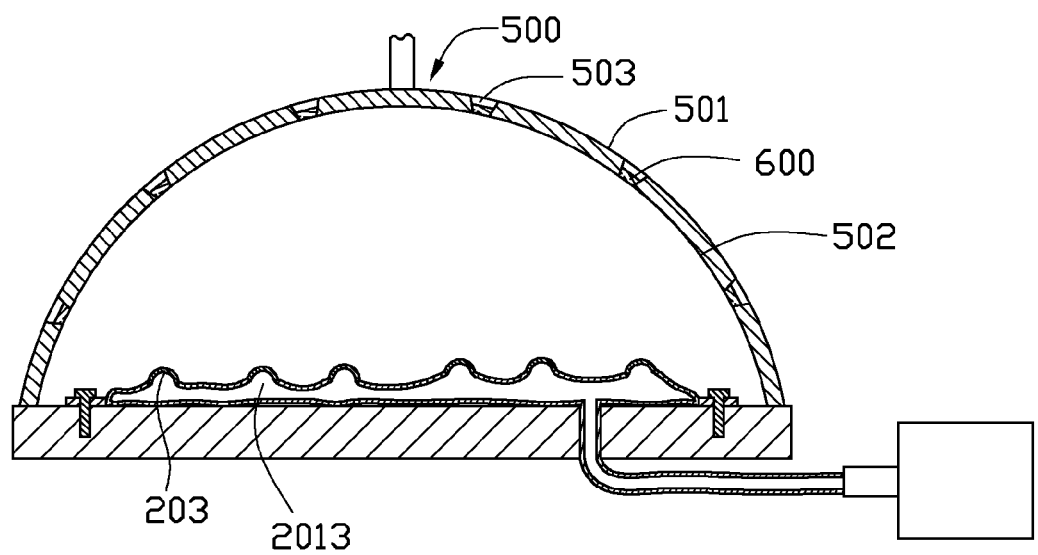
FIG. 3 is a cross-sectional, schematic view showing the ejecting device in a first using stage.
Figure 4:
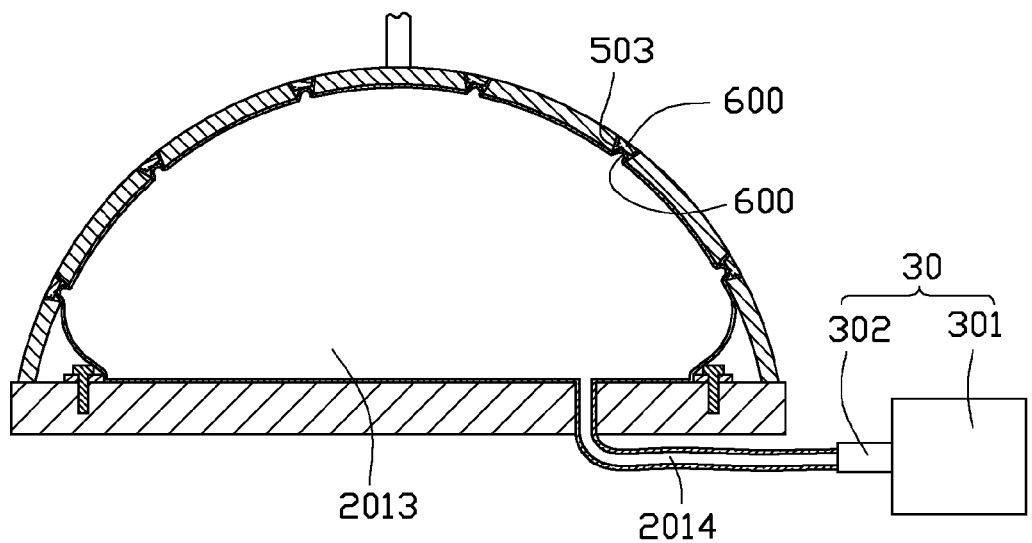
FIG. 4 is a cross-sectional, schematic view showing the ejecting device in a second using stage.

FIGS. 3 and 4 show that in use, the ejecting device 100 is moved in the coating device to be under an umbrella-shaped rack 500. The rack 500 is attached on the top surface 101 and receives the balloon member 20. The rack 500 includes a convex outer surface 501 and a concave inner surface 502 opposite to the outer surface 501. The inner surface 502 faces the top surface 101. The rack 500 defines a number of accommodating holes 503 passing through the outer surface 501 and the inner surface 502. The accommodating holes 503 are uniformly distributed on the outer surface 501, for one example, the accommodating holes 503 can be distributed in a number of concentric circles and accommodating holes 503 in each circle are uniformly spaced. The number of the accommodating holes 503 corresponds to the number of the ejecting portions 203. Each accommodating hole 503 is substantially a truncated cone, which is tapered from the outer surface 502 to the inner surface 501. Each accommodating hole 503 receives a workpiece 600 for being coated. Each workpiece 600 can be a lens and a thickness of each workpiece 600 is less than a depth of each accommodating hole 503. Because each accommodating hole 503 is a truncated cone, each workpiece 600 can be steadily received in the accommodating hole 503.

Then, the fluid supplying device 30 supplies fluid to the receiving chamber 2013 of the balloon member 20, when the receiving chamber 2013 is full filled with the fluid, the main portion 201 has a invariable shape, of which a shape of the upper layer 2011 generally corresponds to a shape of the inner surface 502. The upper layer 2011 attaches to the inner surface 502. Each ejecting portion 203 is full filled with fluid and a shape of each ejecting portion is substantially hemispherical. Each ejecting portion 203 inserts into a corresponding accommodating hole 503 from the inner surface 502. Then each workpiece 600 is ejected out of a corresponding accommodating hole 503 by a respective one of the ejecting portion 203 from the outer surface 501.

The workpieces 600 can be simultaneously ejected out of the accommodating holes 503 by the ejecting portions 203 of the balloon member 20, therefore efficiency is significantly increased.

In alternative embodiments, the fixing elements 40 and the margin portion 202 can be omitted, the lower layer 2012 can be adhered to the top surface 101 to fix the balloon member 20 onto the supporting plate 10.

In alternative embodiments, the supporting plate 10 can be fixed on a transmission machine. The transmission machine transmits the supporting plate 10 under the rack 500 after the workpieces 600 are coated.

In alternative embodiment, the shape of the main portion 201 when the main portion 201 is full filled with fluid can be designed according to a shape of the rack 500, for example, when the rack 500 is a flat plate, the shape of the main portion 201 when the main portion 201 is full filled with fluid can be substantially flat.

In alternative embodiments, each workpiece 600 can be still in a corresponding accommodating hole after being ejected by a respective ejecting portion 203 rather than out of the corresponding accommodating hole 503, but each workpiece 600 must protrude out the outer surface 501 such that an operator can conveniently pick up the workpiece 600.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An ejecting device comprising:
a supporting plate comprising a top surface; and
a balloon member fixed on the top surface, the balloon member comprising a main portion and a number of ejecting portions, the main portion being configured for receiving fluid, the main portion the main portion comprising an elastic lower layer attaching to the top surface and an elastic upper layer opposite to the lower layer, the ejecting portions formed on a surface of the upper layer facing away from the lower layer, the ejecting portions distributed in a plurality of concentric circles and the ejection portions in each circle being uniformly spaced; wherein, when the main portion is fully filled with the fluid, each ejecting portion protrudes from the main portion.

2. The ejecting device as claimed in claim 1, wherein a periphery of the upper layer is connected and sealed with a periphery of the lower layer and each ejecting portion extends up from the upper layer.

3. The ejecting device as claimed in claim 2, wherein the upper layer, the lower layer and the ejecting portions cooperatively define a receiving chamber for receiving the fluid, the main portion has an invariable shape when the receiving chamber is fully filled with the fluid.

4. The ejecting device as claimed in claim 1, wherein the main portion further comprises an inlet portion extending from the lower layer away the upper layer, the inlet portion is in communication with the receiving chamber; the ejecting device further comprises a fluid supplying device connected to the inlet portion for supplying the fluid to the receiving chamber.

5. The ejecting device as claimed in claim 1, wherein the fluid is gas.

6. The ejecting device as claimed in claim 1, wherein the balloon member further comprises a margin portion surrounding the main portion, the supporting plate defines a number of first mounting holes on the top surface, the margin portion defines a number of second mounting holes, each mounting corresponds to a respective one of the first mounting holes, the balloon member is fixed to the supporting plate by a number of fixing elements, each fixing element passes through a corresponding second mounting hole and engages with a corresponding first mounting hole.

7. The ejecting device as claimed in claim 6, wherein the margin portion is annular, the number of the second mounting holes is four and the four second mounting holes are uniformly distributed on the margin portion.

8. The ejecting device as claimed in claim 6, wherein the first mounting holes are blind threaded holes, and the fixing elements are screws.

9. The ejecting device as claimed in claim 4, wherein the supporting plate further comprises a bottom surface opposite to the top surface, the supporting plate defines a receiving hole passing through the top surface and the bottom surface, the inlet portion passes through the receiving hole and protrudes out from the bottom surface.

10. The ejecting device as claimed in claim 1, wherein the balloon member is made of silica gel.

11. The ejecting device as claimed in claim 9, wherein the fluid supplying device comprises a base and a transmission pipe, one end of the transmission pipe is connected to the inlet portion, and the other end of the transmission pipe is connected to the base.

* * * * *